March 29, 1966   B. T. HENSGEN ETAL   3,242,525
SLAUGHTERING

Original Filed Oct. 25, 1963   2 Sheets-Sheet 1

INVENTORS.
BERNARD T. HENSGEN
MICHAEL ZIPAY
BY R.A. Story
ATTORNEY.

INVENTORS.
BERNARD T. HENSGEN
MICHAEL ZIPAY
BY
ATTORNEY.

United States Patent Office 3,242,525
Patented Mar. 29, 1966

3,242,525
SLAUGHTERING
Bernard T. Hensgen, Highland Park, Ill., and Michael Zipay, Wappingers Falls, N.Y., assignors to Swift & Company, Chicago, Ill., a corporation of Illinois
Original application Oct. 25, 1963, Ser. No. 318,971. Divided and this application Jan. 28, 1965, Ser. No. 440,975
2 Claims. (Cl. 17—45)

This application is a division of our prior copending application S.N. 318,971, filed October 25, 1963.

This invention relates generally to an improved method for automatically stunning and sticking animals. More specifically this invention relates to an improved method for automatically restraining, stunning and sticking hogs.

It is presently common practice in modern slaughtering operations to stun animals, by mechanical or electrical means, while the animals are held within a restraining device. In current practice it is necessary for an operator to first engage the animal within a restraining apparatus, and then manually apply a stunning instrument against the head of the restrained animal. Once the animal is stunned the operator then releases the carcass from the restraining apparatus and causes it to be conveyed therefrom to another location, and usually to a second operator, where the unconscious animal is stuck while lying prone, that is, the animal is stuck by severing blood vessels within its neck.

However, the time between which the animal is stunned and stuck is critical insofar as an animal may regain consciousness during the time it is being removed from the restraining apparatus. Also, it is obvious that a decrease in the time required for both stunning and sticking an animal will lead to a greater rate of production for a given processing line. Also, the foregoing procedure, for most economical utilization of equipment, requires at least two operators, and any reduction in the number of operators required will also affect definite economies of operation.

Accordingly, it is a principal object of this invention to provide an improved method for stunning and sticking animals which will decrease the amount of time for performing these operations.

It is another object of the present invention to provide an improved method for both stunning and sticking animals in a single piece of equipment by a single operator.

Fundamentally, the present method involves the urging of animals, such as hogs, along a path, and at a point therealong the animals are restrained by engaging the sides of the neck. Thereafter the neck and head of the animal are forced downwardly to a posture exposing the head for stunning. The animal is then stunned from above the head and thereafter the underside of the neck is severed, opening the blood vessels therein, while the neck of the animal remains restrained. Finally, the restraint of the animal is released and it is ejected substantially in the original direction of movement.

An apparatus for carrying out this method basically comprises a neck engaging means mounted upon a bed whereon the animal may walk. The neck engaging means restrains the neck of the animal causing it to halt, and also supports an animal stunning means above the head of the animal. A separate neck depressing means is located adjacent the engaging means for contacting the animal's head and neck to insure its proper position within the engaging means and with respect to the stunning means. Also, positioned beneath the engaging means in the path of the animal is a sticking means for severing the blood vessels within the neck of the animal after it has been stunned. The bed of the apparatus is also adapted for automatically discharging a stunned and stuck animal from the engaging means.

Futher objects and advantages of the present invention will become apparent from reading the following detailed specification in conjunction with the drawings wherein.

Figure 2:
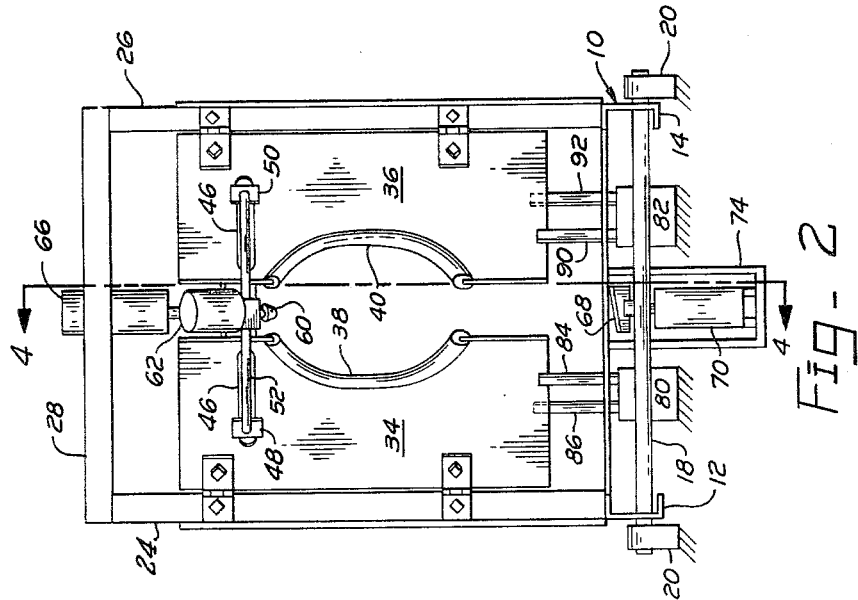
FIGURE 2 is an end elevation view of the apparatus of FIGURE 1.

In performing the method of the present invention, which is particularly adaptable to hogs, the animals are urged single file along a narrow path in a direction toward neck engaging means which partially blocks the path while leaving a forward line of sight open to the animal. The animals are spaced or held back by a drover sufficiently to permit only a single animal to approach the neck restraining means at a time. The neck restraining means is in the form of a pair of pivotable doors hinged at either side of the bath and normally slightly ajar presenting an opening for the animal's forward movement. The animal will attempt to pass between these doors but when the neck becomes partially engaged the animal will hesitate and tend to back up. The retreat of the animal is utilized to securely engage its neck and align a stunning means with its head. Also at this time the head and neck of the animal are forced downwardly from above so as to expose a portion of the head above the animal's eyes to the stunning means.

The stunning means is thus actuated to render the animal unconscious. Immediately thereafter, and while the neck of the animal remains restrained, the underside of the neck, and blood vessels therein, are automatically severed by a sticking means positioned in the path of the animal below the restraining means. Subsequently, the restraining means are released and the animal is ejected substantially in the direction of original movement.

In the preferred practice of the invention the animals are ejected from the restraining means by tilting the carcass upwardly and forwardly. Where this procedure is followed, the tilting movement of the carcass may be commenced either before or after the neck of the animal is severed. However, the latter step must be completed before the animal is released from the restraining means.

An apparatus for carrying out the foregoing method is illustrated in FIGURES 1 through 4. In this preferred apparatus the animals are urged to walk singly upon a bed generally 10 constructed of two horizontal channel members 12, 14 with a floor 16 of mesh sheeting or the like suspended therebetween. The channel members 12, 14 are pivotally mounted at the forward end thereof (to the left in FIGURES 3 and 4) by means of a pivot shaft 18 extending therethrough and journaled in a pair of pillow bearings 20. The pillow bearings 20 are in turn secured to the foundations of the packing house or the like.

A vertical frame, generally 22, comprising a pair of upright members 24, 26 and an overhead interconnecting cross piece 28, is spaced a short distance rearwardly of the forward end of the bed generally 10. The apparatus may include a pair of sidewalls 30, 32 extending rearwardly from the uprights 24, 26, which sidewalls are spaced with respect to one another in accordance with the size of animals being processed.

An engaging means for contacting the neck of an animal advancing on bed 10 comprises a pair of forwardly pivotable doors 34, 36 hingedly mounted to the uprights 24, 26 respectively. These doors are constructed to be pivotable only forwardly of the vertical frame 22 and cannot be swung to the rear. Normally the doors need not quite meet at the center of the bed generally 10; and they are preferably formed with arcuate shaped openings 38, 40, respectively, preferably lined with tubular cushions, for engaging the sides of a neck of an animal.

A stunning means located to operate on the head of an animal is supported from the pivotable doors 34, 36 in the following manner. Each door contains a horizontal slot 46 near its upper margin. Slidable followers 48, 50 are captively held within the slots 46 and each of the doors 34, 36 respectively. A yoke 52, extending forwardly of the doors, is pivotally attached to the followers 48, 50.

The stunning means itself is secured to the center of the yoke 52 and, while it may comprise one of several well known instruments, it is preferably of the type including a mushroom shaped hammercap 60 which is reciprocable by an actuater 62 such as the pneumatic cylinder and piston illustrated.

It may be observed that as the doors 34, 36 are pivoted the yoke 52, which is preferably of a double arcuate shape so as not to interfere with movement of the doors, will tend to hold the stunning means substantially centrally of the opening between the two doors regardless of their position relative to one another. That is, if an animal should tend to open one door further than the other, the movement of the followers 48, 50 and the yoke 52 in the slots 46 will tend to position the stunning instrument evenly between the two doors. Thus a further advantage of this apparatus is that the stunning instrument will be automatically aligned with the head of the animal.

Because there is always atn opening provided between the two doors 34, 36, an animal approaching them will usually attempt to move therebetween. However, as the cushions on the arcuate openings 38, 40 engage the animal's neck, it will usually tend to halt and then back up. The forward movement of the doors is limited, while the bed generally 10 is disposed horizontally, by structure which will subsequently be explained. Also, since the yoke 52 is pivotally attached to the followers 48, 50, the stunning means will normally tend to drop downwardly into the path of the animal's head with the hammercap 60, in the preferred embodiment, in contact with the animal. A head and neck depressing means is supported from the crosspiece 28 of the vertical frame generally 22, to force the head and neck of the animal downwardly in the engaging means so that the stunning device is exposed to the forehead of the animal above the eyes. The depressing means preferably is in the form of a reciprocable engaging member 64 vertically movable by an actuator 66 such as the hydraulic cylinder and piston shown attached to the center of the crosspiece 28.

Once the animal is properly restrained the depressing means is actuated to force the head downwardly and the actuator 62 of the stunning means is energized so as to render the animal unconscious.

The animal is then ready to be stuck while held in the engaging means. For this purpose a vertically reciprocable knife edge 68 is attached to an actuator 70, such as the illustrated hydraulic cylinder and piston, just below the floor 16 of the bed generally 10 at a position slightly forward of the closed position of doors 34, 36. An opening 72 is provided in the floor 16 through which the knife edge 68 may be extended by the actuator 70 upwardly to sever the underside of the animal's neck. The actuator 70 in turn is secured by a mounting bracket 74 preferably to the underside of the bed generally 10.

A pair of stanchions 80, 82 are located beneath the doors 34, 36 and the floor 16 of the apparatus bed generally 10. Each stanchion is separate from the bed generally 10 and independently secured to the foundation, or the like, of the packing plant. On the left side stanchion 80 (as seen in FIGURE 2) is mounted a fixed stop member 84 and a pivotally mounted latch 86. As may be seen in FIGURES 2 and 4 the stop member 84 limits the forward motion of the door 34 while the bed generally 10 is in the horizontal position. The pivotally mounted latch 86 is positioned to the rear of the stop member 84 to engage the door 34 and thereby prevent it from again being moved forwardly after an animal attempts to retreat and thereby tightens the doors about its neck. The stop member 84 and latch 86 extend upwardly through a slot 88 in the floor 16 of the apparatus.

Similarly, mounted on the stanchion 82 at the right side of the apparatus are a stop member 90 and pivotally mounted latch 92 which extend through a slot 94 in the floor 16 to control movement of the door 36.

Thus it will be seen that when the bed of the apparatus is held horizontally and an animal enters between the doors 34, 36, the latter are limited in forward movement by the stop members 84, 90. Therefore the animal is forced to attempt to retreat and the doors will then become locked in the closed position by the latches 86, 92. However when the bed generally 10 of the apparatus is pivoted upwardly (counter-clockwise in FIGURES 3 and 4) about shafts 18 the doors 34, 36 will be raised through a short arc away from engagement with either of the stops or latches and will be free to open forwardly, allowing the animal carcass to slide forward from the apparatus onto a transfer conveyor or the like, not shown.

Figure 1:
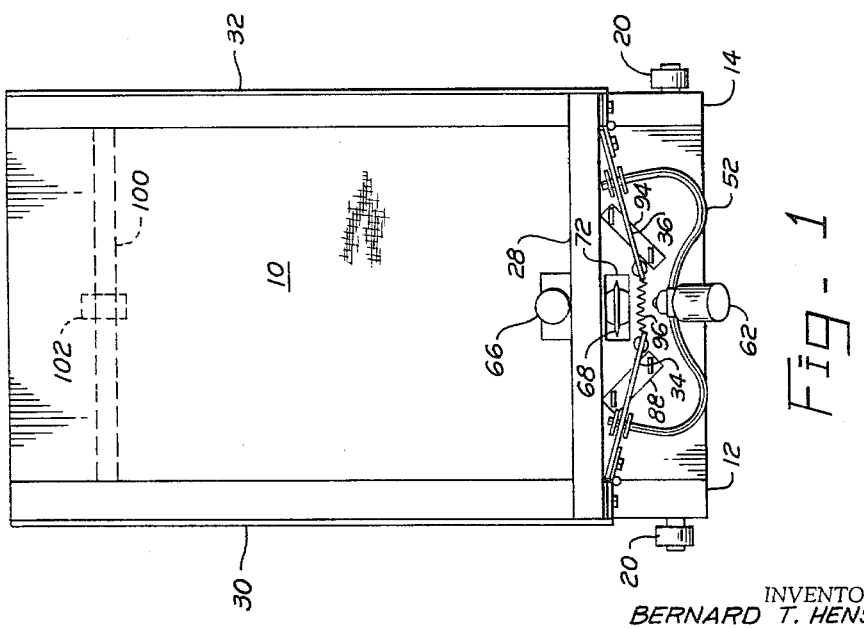
FIGURE 1 is a plan view of an embodiment of the present apparatus.
Figure 3:
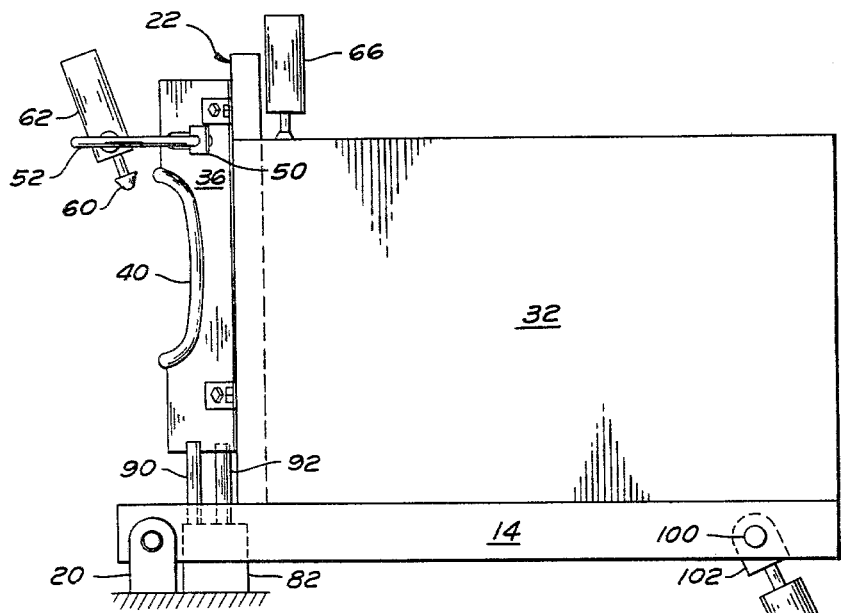
FIGURE 3 is a side elevation view of the apparatus of FIGURE 1.
Figure 4:
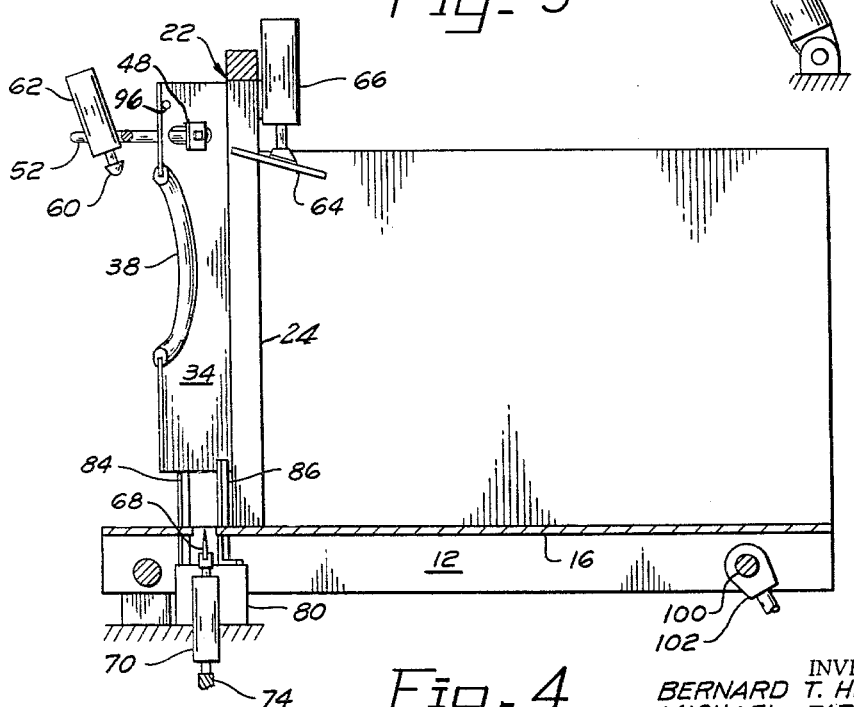
FIGURE 4 is a sectional side elevation of the apparatus taken at line 4—4 in FIGURE 2.

Preferably, a small tension spring 96 seen in FIGURE 1, is connected between the doors 34, 36, at the upper portions thereof, to tend to return the same to a partially closed position after the animal has passed therethrough and before the bed generally 10 is returned to the horizontal position. Tilting of the apparatus is accomplished by means of a mechanical lifter 98, such as a hydraulic cylinder and piston, connected to a cross shaft 100, fixably mounted between the channel members 12, 14 at the rear of the apparatus, by a clevis 102 as shown in FIGURE 3.

The operation of the preferred apparatus will have become clear from the preceding description. It will be apparent to those skilled in the art that actuation of the various elements of the apparatus may be independently controlled in a normal manner by a single operator. Also, it will be apparent to those skilled in the art that the elements may be automatically actuated through the foregoing sequence either upon the initiation of an operator or by commencing the sequence of operation by trip switches (not shown) connected to the latches 86, 92.

Obviously many modifications and variations of the invention as hereinbefore set forth may be made without departing from the spirit and scope thereof, and therefore only such limitations should be imposed as are indicated in the appended claims.

We claim:

1. An improved method for automatically stunning and sticking animals in a slaughtering operation, said method comprising: urging an animal in a given direction; engaging the sides of the neck of said animal and halting said animal's movement; forcing the animal's neck downwardly into a head-down posture by applying a force at the back thereof while the animal's body remains substantially horizontal; immediately thereafter stunning the animal while so held; then sticking the blood vessels in the underside of the neck of the stunned animal while so held by severing only the underside of the animals neck; and thereafter moving the animal forwardly in said direction and releasing the neck of said animal so that the animal slides forwardly with head and body substantially upright and intact.

2. An improved method for automatically stunning and sticking hogs and other animals of similar size in a slaughtering operation, said method comprising: urging an animal in a given direction; engaging the sides of the neck of said animal and halting such animal's movement; forcing the animal's neck downwardly into a head-down posture by applying a force at the back thereof while the animal's body remains substantially horizontal; immediately thereafter stunning the animal by striking the head of the animal while so held; then severing the blood vessels in the underside of the neck of the stunned animal while so held by severing only the underside of the animal's neck; and tilting the animal forwardly and releasing the neck of said animal to discharge the animal forwardly in said direction so that the animal slides forwardly with head and body substantially upright and intact.

References Cited by the Examiner

UNITED STATES PATENTS

| | | | |
|---|---|---|---|
| 2,979,762 | 4/1961 | Schulz | 17—1 |
| 3,088,163 | 5/1963 | Weprin et al. | 17—1 |
| 3,101,508 | 8/1963 | Murphy et al. | 17—45 |

FOREIGN PATENTS 206,934  2/1909  Germany.

SAMUEL KOREN, *Primary Examiner.*

LUCIE H. LAUDENSLAGER, *Examiner.*